Figure 1:
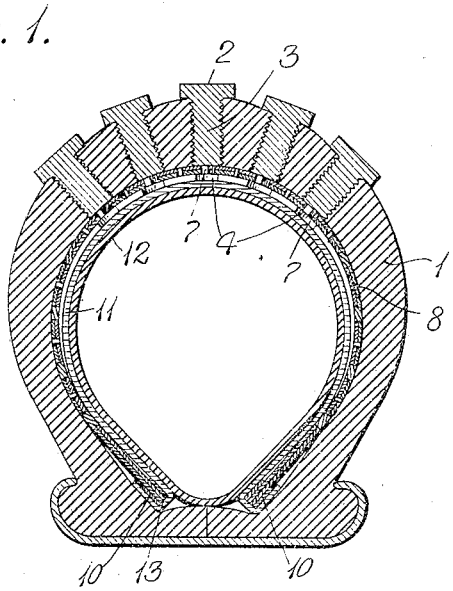

B. J. ZOBEL.
TIRE.
APPLICATION FILED JUNE 12, 1914.

1,131,809.

Patented Mar. 16, 1915.

Witnesses
Chas. W. Stauffger
Anna M. Carr

Inventor
Benjamin J. Zobel,

By

Attorneys

UNITED STATES PATENT OFFICE.

BENJAMIN J. ZOBEL, OF DETROIT, MICHIGAN.

TIRE.

1,131,809.  Specification of Letters Patent.  Patented Mar. 16, 1915.

Application filed June 12, 1914. Serial No. 844,637.

*To all whom it may concern:*

Be it known that I, BENJAMIN J. ZOBEL, a citizen of the United States of America, residing at Detroit, in the county of Wayne and State of Michigan, have invented certain new and useful Improvements in Tires, of which the following is a specification, reference being had therein to the accompanying drawings.

This invention relates to tires of that type wherein a pneumatic tube is arranged in an outer casing, tube or similar structure, the former constituting the resilient or cushioning element and the latter a protecting element for the pneumatic tube.

The primary object of my invention is to provide a tire of the above type with a novel metallic shield that is arranged between the pneumatic tube and the outer casing to prevent the pneumatic tube from being punctured or otherwise injured by objects that pierce or cut the outer casing, thereby eliminating one of the troublesome features of operating an automobile or other vehicle.

Another object of this invention is to furnish the outer case or shoe of a pneumatic tire with simple and effective means, in a manner as hereinafter set forth, to prevent skidding or sliding of the tire when wet and slippery surfaces are encountered or when a machine rapidly passes over a curved section of road.

A further object of this invention is to provide a tire with an inner armor that is held in engagement with the outer casing or shoe of the tire and prevented from becoming accidentally displaced, particularly when the pneumatic tube is removed from the outer case.

A still further object of this invention is to provide a tire that is strong and durable, easy to manufacture, and highly efficient in connection with the wheels of various types of vehicles.

With the above and other objects in view, the invention resides in the novel construction, combination and arrangement of parts to be hereinafter specifically described and then claimed, and reference will now be had to the drawing, wherein—

Figure 3:
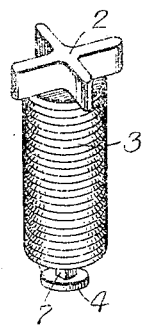
Figure 2:
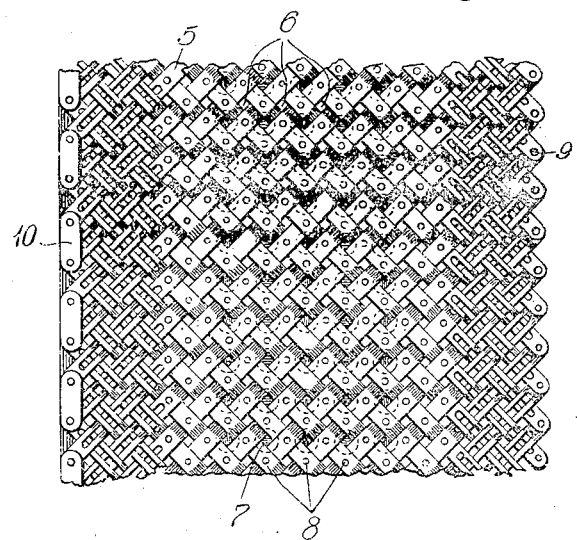
Figure 2:

Figure 1 is a cross sectional view of a tire in accordance with my invention; Fig. 2 is a plan or a developed view of a portion of a flexible metallic shield adapted to form part of the tire, and Fig. 3 is an enlarged perspective view of one of the anti-skidding devices of the tire.

In the drawing, 1 denotes an outer casing or shoe that has a cross sectional shape similar to outer casings or shoes of the ordinary and well known type used in connection with automobile wheels. The outer casing is made of rubber or other material and the periphery or tread thereof is provided with spaced antiskidding devices, each comprising a head 2, a shank 3 and a rivet 4. The devices are arranged in rows transversely and circumferentially of the outer casing, and the heads 2 thereof are pronged, bifurcated or roughened, as best shown in Fig. 3, whereby the heads will engage a surface and prevent the tread of the outer casing from skidding or slipping thereon. The heads 2 are larger than the shanks 3 and said shanks are circumferentially grooved or roughened whereby the rubber or material forming the outer casing will obtain a firm purchase upon the anti-skidding devices and prevent their dislodgment or their working loose in the tread of the outer casing. The shanks 3 extend through the tread of the outer casing and the rivets 4 thereof are employed for holding a flexible metallic shield in engagement with the inner side of the outer casing.

The flexible metallic shield is best shown in Fig. 2, said shield comprising strips of sheet metal 5 that are interwoven in a manner as to leave small rectangular spaces or interstices 6 through some of which extend the rectangular stems 7 of the rivets 4. The interwoven strips, at the central portion of the shield, are riveted or otherwise connected, as at 8, whereby the interwoven strips will be maintained in proper relation. As the strips 5 are interwoven the rivets 4 are placed in position and after the strips are riveted it is impossible for the anti-skidding devices to become accidentally displaced relatively to the shield. It is preferable to connect the anti-skidding devices to the shield prior to mounting or molding the anti-skidding devices in the outer case or shoe 1.

The ends of the strips 5 are longitudinally slotted to reduce the weight of the shield and to add flexibility to the same and the extreme ends of the strips are apertured, as at 9, and connected by longitudinally disposed links 10. The links are alternately arranged upon opposite sides of the shield, and said links coöperate with the rivets 8 in holding the strips assembled, also in preventing the ends of the metallic strips from cutting into and injuring the outer casing or shoe of the tire. It is in this connection, that a strip of canvas, leather or other durable material 11 is placed against the inner side of the shield to prevent the shield from injuring a pneumatic tube 12 placed in the outer casing or shoe. The strip of material 11 has the edges thereof out-turned or wrapped around the linked edges of the shield, as indicated at 13, thereby further protecting the outer casing or shoe from any abrasive action of the edges of the shield.

From the foregoing it will be observed that the shield serves functionally as an inner armor or lining and with the same made of flat flexible strips, there is sufficient flexibility in the armor to permit of the same yielding by pressure or a load upon the tire. There is also a degree of resiliency on account of the shield or armor encircling the greater part of the pneumatic tube and being held in an arcuated position by the outer casing or shoe. There is also a coöperation between the armor and the antiskidding devices that prevents either from becoming accidentally displaced and each performs its duty and thereby contributes to the roadworthiness of a tire.

It is thought that the utility of the tire will be apparent without further description, and while in the drawing there is illustrated a preferred embodiment of my invention, it is to be understood that the structural elements are susceptible to such changes, as in the size, shape and manner of assemblage, as fall within the scope of the appended claim.

What I claim is:

The combination with an outer casing, and a pneumatic tube within the casing, of anti-skidding devices disposed upon the periphery of said outer casing and having roughened shanks embedded within said outer casing, an interwoven flexible metallic shield arranged against the inner side of said outer casing and composed of strips connected at their intersections and providing interstices, stems carried by the shanks of said anti-skidding devices and extending through some of the interstices of said shield for retaining said shield in engagement with said outer casing, said strips having the ends thereof slotted, links connecting the ends of said strips, and a strip of material between said inner tube and the said shield with the edges thereof wrapped around the linked edges of the shield.

In testimony whereof I affix my signature in presence of two witnesses.

BENJAMIN J. ZOBEL.

Witnesses:
 KARL H. BUTLER,
 G. E. MCGRANN.